Nov. 29, 1927.       1,651,311
H. ATKINSON
RECOVERY OF PETROLEUM FROM OIL BEARING SANDS
Filed April 14, 1926
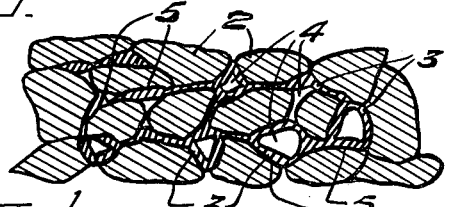
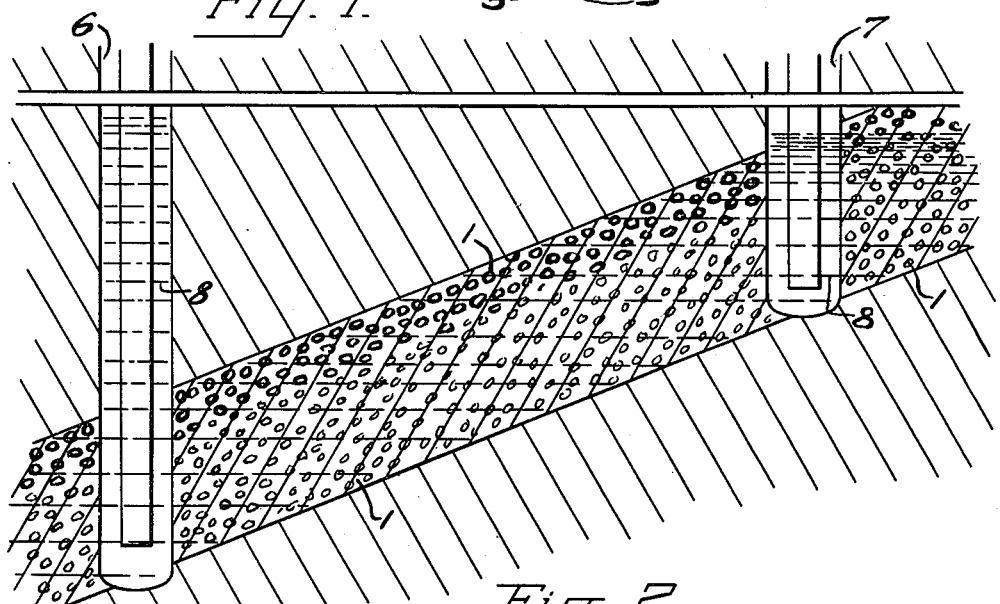
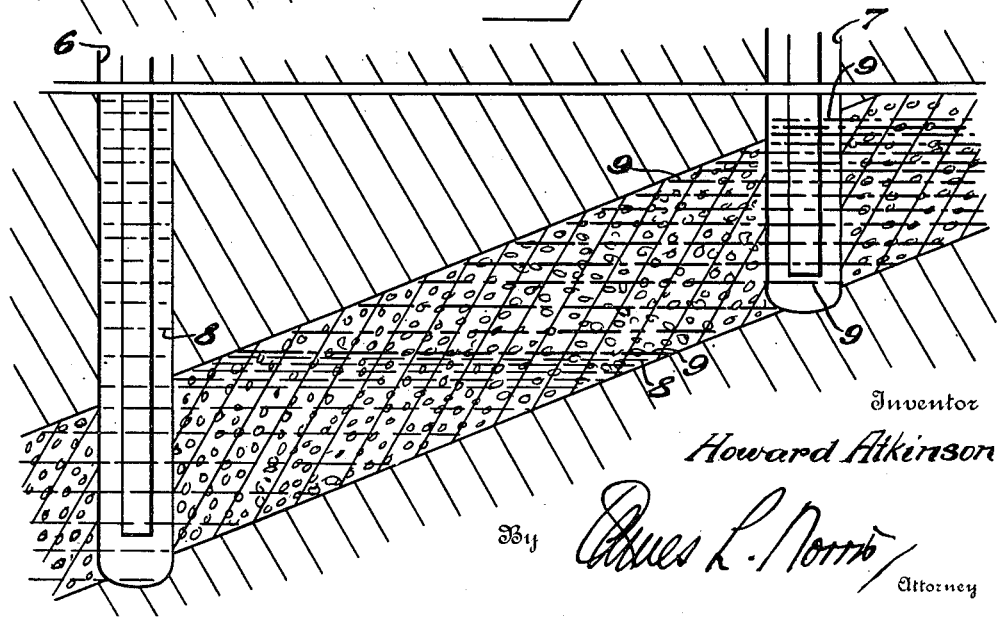
Inventor
Howard Atkinson Patented Nov. 29, 1927.

1,651,311

UNITED STATES PATENT OFFICE.

HOWARD ATKINSON, OF CHARLESTON, WEST VIRGINIA, ASSIGNOR, BY MESNE ASSIGNMENTS, OF EIGHT-TENTHS TO HOWARD ATKINSON, ONE-TENTH TO FRANCIS K. HOLMESTEAD, AND ONE-TENTH TO JOHN B. ADAMS, ALL OF CHARLESTON, WEST VIRGINIA.

RECOVERY OF PETROLEUM FROM OIL-BEARING SANDS.

Application filed April 14, 1926. Serial No. 102,034.

The present invention relates to the extraction of oil from oil wells, and it is applicable more particularly to the extraction of oil or petroleum from oil wells which under the present practices of recovery, are considered to be non-productive.

The object of the invention is to provide a method whereby oil or petroleum may be extracted with facility and in profitable quantities from oil wells from which oil has been extracted until they have ceased to produce oil in what is generally considered to be profitable quantities and especially from oil wells which have become flooded with water and abandoned, as, for example, so-called "edgewater" wells.

It is generally known that in extracting oil from oil wells by the methods heretofore employed, a considerable amount of oil is left unrecovered from the oil-bearing fields, it being the general opinion that about 50 per cent or more of the deposit of oil originally present in a field remains unrecovered when a field is abandoned as exhausted. Efforts have been made to recover more oil from such fields, as, for example, by forcing air or natural gas or water through the oil-bearing formations and by vacuum pump process, but such methods have been expensive and injured the wells, and they have not been generally successful.

There appear to be many causes for the failure of the methods heretofore used for the extraction of the oil remaining in oil-bearing sands after such oil as will drain naturally therefrom has been extracted. Some of the oil remaining in the sand after the natural flow of oil from the well has ceased, is contained in pockets formed by the interstices between the grains of oil-bearing sands. The capillarity and adhesive properties of the oil also cause part of the oil to wet and adhere as films to the grains of sand after the oil which naturally flows from the sand has been drained therefrom. While these oil films are comparatively thin, the aggregate surface area of the grains of sand in a given volume thereof is enormous, so that a considerable quantity of oil will be retained in this way in the sand. Furthermore, the viscosity of the oil acts in conjunction with the forces of capillarity and adhesion to hold the oil in the pockets formed by the interstices between the grains and to resist its flow therefrom, and large quantities of oil, held in the sand, as described above, becomes "trapped" or pocketed when the oil sands are flooded. Such methods as have been heretofore proposed or used were unable to overcome these influences.

The present invention provides a method whereby a large quantity of the oil which will not drain naturally from the oil-bearing sand and, hence, remains after the extraction of oil therefrom in the usual way has been completed, is recovered. It is based upon the discovery that when a mass of sand wetted with oil or petroleum is, at ordinary temperature, submerged in water to which is added any strong alkali, the oil contained in the sand is, within a short time, removed from the sand in a body, leaving the sand practically clean and free from oil. When a saturated solution of any strong alkali, such, for example, as soda ash, caustic soda or caustic potash is used, substantially complete removal of the oil from the sand is effected usually in a comparatively short time. From this, it is evident that such treatment of the sand overcomes the influences of capillarity, adhesion and viscosity which act to retain the oil in the sand, thus enabling comparatively complete recovery of the oil therefrom.

According to the present invention, the oil-bearing sand from which the oil recoverable by the usual methods has been extracted, is subjected, while the sand is flooded or saturated with water, to an application of a strong alkali, preferably in saturated aqueous solution, such solution being prepared, for example, in suitable receptacles on the surface of the ground near the well used to introduce the solution into the under-ground oil sands. This saturated alkaline solution is introduced into said oil well, partially or completely filling it, and is allowed to stand in the well. The advantage of partially or completely filling the well is to gain a hydrostatic head, which, at the foot of the well will exert a great pressure that will force the alkaline solution in all directions throughout the oil sands adjacent to well bottom, thereby aiding the beginning of the process of diffusion of solution which is set up when the concentrated solution is brought into contact with sweet or salt water present in the oil sands adjacent thereto. As the solution is diffused throughout the oil sands it becomes more and more dilute and the "head" of solution in the well will continue to supply saturated solution to the oil sands, thereby ultimately bringing about by osmotic pressure a practically complete diffusion of the strong alkaline solution throughout all adjacent oil sands. The solution in the well can be maintained at a height desired by addition of such quantities, at the head of the well, as are necessary to offset the flow out at the bottom. The solution so introduced will dislodge most of the oil contained in the interstices of the sand or forming films on the grains thereof, thus causing oil thus dislodged to float or flow to a higher level of the oil reservoir or other points of equilibrium, whence such oil may be pumped or otherwise removed.

In the accompanying drawing:—

Figure 1 represents diagrammatically a vertical section through a body of oil-bearing sand containing oil remaining therein after the oil has been extracted therefrom by natural draining, and two adjacently located wells communicating therewith;

Figure 2 is a view similar to Figure 1 but illustrating diagrammatically the manner in which the oil remaining in the body of sand is dislodged therefrom and displaced at a point where it can be pumped or removed from one of the wells; and Figure 3 represents a cross-section, on a greatly enlarged scale, through a body of oil-bearing sand after such oil as will drain naturally therefrom has been extracted, illustrating the manner in which the oil remaining after such extraction is retained in the sand.

In these drawings, 1 (Fig. 1) designates a stratum of oil-bearing sand containing such oil as remains therein after the oil capable of draining from the sand has been extracted. Fig. 3 represents diagrammatically the manner in which this oil remaining in the sand is retained therein, 2 designating the grains of sand which are wetted or coated with films 3 of oil held thereon by the forces of capillarity and adhesion, and 4 designating the pockets or interstices between the sand grains and which contain oil, especially at the crevices or angles formed between the sand grains, as indicated at 5, the viscosity of the oil, as well as the forces of capillarity and attraction acting to retain the oil in these pockets or interstices. The stratum of oil-bearing sand is shown inclined somewhat from the horizontal, this condition being usually found in oil fields. 6 and 7 represent adjacent wells of an oil field, these wells reaching down to the stratum of oil-bearing sand at different points, these being, for example, the wells through which the oil which drained naturally from the sand was extracted. The stratum of oil-bearing sand is represented in Fig. 1 as flooded with water, indicated at 8, whereas, Fig. 2 indicates diagrammatically the manner in which the oil which has remained in the sand is dislodged and displaced in accordance with the present invention and flooded by the water 8 to the upper portion or level of the reservoir where it forms a body of oil 9 which can be pumped or extracted by the operation of the well 7 in the usual way.

In carrying out the method as applied to oil wells which have become non-productive, or which have ceased to produce oil by the usual method of extraction, the procedure is as follows:

Where the method is applied to wells which have already become flooded with water, as, for example, "edgewater" wells, the alkaline solution previously prepared is poured or otherwise introduced directly in the well, for example, the well 6; and when applied to dry wells or those which have not become flooded, the well is first flooded with water, until the oil-bearing sands have become flooded or saturated with water, after which the alkaline solution is introduced into the well, for example, the well 6. The amount of alkaline solution used in each case may vary, although it is preferable to introduce the solution in doses, the first dose being sufficient to partially or completely fill the well with the solution and further doses being added from time to time as may be required, to keep the solution at the desired height in the well. After the treatment with the alkaline solution has continued for a sufficient length of time, which may vary from several days in some cases to a longer period in other cases, another well adjacent to the well into which the solution was introduced, such as the well 7, which may be either an existing well or a new well drilled for the purpose, is pumped, and if the solution has sufficiently penetrated the sand, the oil displaced from the sand by the solution will be extracted from said adjacent well; but if the solution has not sufficiently penetrated the sand, as will be understood by the absence or small amount of oil extracted from the adjacent well, the treatment with the solution may be continued and the adjacent well pumped at appropriate intervals until oil is obtained therefrom.

The partial or complete filling of the well with the alkaline solution produces a hydrostatic head or pressure at the bottom or foot of the well, this pressure being a high one and it acting to force the solution in all directions through the oil sands adjacent to the well bottom, thus aiding the starting of the process of diffusion which takes place when the concentrated solution comes into contact with the water which floods or saturates the adjacent oil-bearing sands. As the solution becomes diffused through the sands it becomes diluted, but fresh solution passes from the well containing it into the sand, thus making up for the dilution which takes place, and the supply of fresh solution is under high hydrostatic pressure, so that eventually the solution will become diffused throughout the oil-bearing sands. For practical purposes, it may be desirable in some fields to select and use one or more wells or groups of wells as "solution wells" in order that the area of sand involved will be permeated with the solution at the highest practicable degree of saturation, it having been found that the greater the degree of saturation of the solution permeating the sand, the quicker will be the movement or displacement of the oil from the sand.

By introducing the alkaline solution into a well which is flooded with water, such solution will become diffused throughout the water saturating the body of oil-bearing sand, such diffusion taking place rapidly, due to osmotic pressure produced by the mixing or bringing together of the alkaline solution and the water saturating the sand. The alkaline solution thus rapidly penetrates all portions of the sand, and its action is such that it removes the oil remaining therein after the usual method of extraction has been completed, whether this remaining oil fills the pockets formed by the interstices between the grains of sand or is in the form of films covering the grains of sand, or is pocketed in the finer strata of the oil sand by the flood water, the solution causing the oil thus removed to be freed so that it may rise, by reason of its lighter specific gravity, to the top of the water or solution and to float or flow off to seek equilibrium at the upper part of the oil reservoir or anticlinal or at a point whence it may be readily removed by pumping an existing adjacent well or wells, or by drilling new wells.

The alkaline solution may be used at any ordinary temperature and it may be of different concentrations, although a saturated solution, or a solution of maximum concentration, is preferable because of its strength which insures most rapid and extensive diffusion of the solution through the water which floods the oil-bearing sand. Also, any of the alkali metals or any of the alkaline earth metals or the hydroxides of any of them, or the alkaline reacting salt or base of any of these metals may be used in preparing the alkaline solution, a saturated aqueous solution being preferably used, although it is preferable to use the strong alkalis, such, for example, as soda ash, caustic soda (sodium hydroxide), or caustic potash (potassium hydroxide), owing to their great power of diffusion through water contained in the oil-bearing sand and their low cost in comparison with the amount and hence the value of the oil recovered by their use.

The concentration of the flooding water required in different wells to release and enable recovery of the oil held in the sands after natural exhaustion has occurred, will vary. In fields where the oil to be recovered has a paraffine base, as in the Pennsylvania fields, a concentration of about 1% of alkali in the flooding water filling the oil bearing sands will be sufficient to release the oil from the sands and permit its removal; in fields where the oil has a semi-paraffine base, a concentration of from 1% to 2% of alkali in the flooding water will act efficiently; and in fields where the oil has a bitumen base, a concentration of about 15% alkali in the flooding water will release and permit recovery of oil remaining in the sands after natural exhaustion has occurred. The concentration in each instance may be greater but the concentration given above will ordinarily enable the oil remaining in the sands to be recovered at a profitable rate and without waste of the alkali as may occur if higher concentrations are used.

The present invention enables the alkali naturally present in salt waters which flood many wells to be utilized in releasing the oils from the flooded sands. Most of the top, bottom and edge waters are heavy salt waters, and most of them are alkaline. Such waters are usually soda ash solutions although they are of low concentration, they containing sometimes as high as ½% of soda ash. By adding thereto sufficient additional soda ash in saturated solution or high concentration to bring the strength of the flooding water in the sands up to about 1% of soda ash, the oil will be released from the sands and may be recovered very economically. By adding caustic soda (sodium hydroxide) to flooding waters which already contain soda ash, either naturally or added thereto, the soda ash solution in the flooding waters will be converted by the caustic soda added thereto into a caustic soda lye which possesses great oil leaching properties, thus enabling the oil retained in the flooded sands to be released and recovered; or caustic soda may be similarly added to fresh water with which the sands may be flooded, either naturally or artificially and to which soda ash has been added.

Ordinarily it will be found most economical to add a soda ash solution to the water flooding the oil bearing sands to secure increased recovery of the oil remaining therein, owing to its availability and cheapness, this being particularly so where the oil is trapped in the sands by the natural encroachment of salt water which naturally contains soda ash in solution, it being merely necessary then to bring the flooding waters up to a concentration sufficient to reduce the tension of the oil and thereby bring about its readier displacement by the water.

The present invention enables the oil trapped in or distributed throughout the sands and which remain therein after natural exhaustion of oil wells to be released and collected at the top of the sands from which point the oil may readily be pumped or otherwise drawn, and the oil thus recovered may be refined and used in the same way as oil extracted from the well in the usual manner. The oil released from the sands is held at the top of the sands by the body of water which floods the sands and displaced the oil therefrom, the oil separating naturally from the water and being maintained at the desired level by keeping at a given level the water beneath it.

I claim as my invention:—

1. The method of extracting oil remaining in oil-bearing sands after such sands have been substantially exhausted of oil capable of draining naturally therefrom which comprises introducing into such sands, which have been previously saturated with water, an alkaline solution of sufficient strength to displace the oil remaining in the sand, and recovering the oil thus displaced.

2. The method of extracting oil remaining in oil-bearing sands after oil capable of draining naturally therefrom has been extracted which comprises introducing into such sands, which have been previously flooded with water, a solution of a strong alkali to bring the flooding water saturating said sands to sufficient concentration to cause it to remove and displace the oil remaining in the interstices of the sand, and recovering the oil thus displaced.

3. The method of extracting oil remaining in oil-bearing sands after oil capable of draining naturally therefrom has been extracted which comprises introducing into water already flooding such sands, a sufficient amount of a solution of soda ash to cause displacement of the oil by the water, and recovering the oil thereby displaced from the sand.

4. The method of extracting oil remaining in oil-bearing sands after oil capable of draining naturally therefrom has been extracted which comprises introducing into water already flooding such sands, a sufficient amount of a solution of caustic alkali to diffuse throughout the water flooding said sands and thereby cause displacement of the oil by the water, and recovering the oil thereby displaced from the sand.

5. The method of extracting oil remaining in oil bearing sands after oil capable of draining therefrom has been extracted which comprises adding caustic soda to water already flooding such sands and containing soda ash thereby forming caustic soda lye solution, and recovering the oil displaced from the sands by said solution.

6. The method of extracting oil remaining in oil bearing sands after oil capable of draining therefrom has been extracted and the sands have become flooded with water containing soda ash which comprises adding to such water already flooding said sands an amount of soda ash sufficient to cause displacement of the oil by the water, and recovering the oil thus displaced.

7. The method of extracting oil remaining in oil-bearing sands after the oil capable of draining naturally therefrom has been extracted which comprises introducing into a body of water which already floods such sand a saturated solution of an alkali, allowing such body of water and solution to stand until the alkaline solution has become diffused through the body of the water which floods said sands and the oil remaining in the sand has become displaced therefrom, and extracting the oil thus displaced.

8. The method of extracting oil remaining in oil-bearing sands after the oil capable of draining naturally therefrom has been extracted which comprises introducing into a well communicating with such sand, while said sand is saturated with water, a strong solution of an alkali, allowing such water and alkaline solution to stand until such solution has become diffused through the water in the sand and the oil remaining therein has become displaced therefrom, and extracting the oil thus displaced from an adjacent well.

9. The method of extracting oil remaining in oil-bearing sands after oil capable of draining naturally therefrom has been extracted which comprises submitting such sands, while permeated with water, to a saturated solution of a strong alkali under hydrostatic pressure, thus causing diffusion of such solution through the water in the sand, and removing the oil thereby displaced from the sand.

10. The method of extracting oil remaining in oil-bearing sands after such sands have been substantially exhausted of oil capable of draining naturally therefrom which comprises filling a well which has been previously flooded with water with a saturated solution of a strong alkali to a height sufficient to produce a substantial hydrostatic pressure of such solution on the oil-bearing sands adjacent to the bottom of the well, allowing such solution to act until it has become diffused through the water which floods the sand, and then removing the oil thereby displaced from the sands through an adjacent well.

11. In the art of procuring crude petroleum from an oil-bearing stratum, the step which comprises introducing into the oil-bearing stratum, which has been previously saturated with water an aqueous soap solution under a pressure causing it to penetrate through the stratum.

12. The process of obtaining oil from an underground mass of oil-sand saturated with water which consists in introducing into the previously water-saturated oil-sand through an opening in the ground a body of water to which has been added a soluble salt adapted to modify the surface tension at the oil-water interface to cause the water to drive the oil through the sand, maintaining contact between the water and the sand to progressively displace the oil in the sand, and collecting the displaced oil.

In testimony whereof I have hereunto set my hand.

HOWARD ATKINSON.